(12) United States Patent
Raman et al.

(10) Patent No.: US 8,571,832 B2
(45) Date of Patent: Oct. 29, 2013

(54) APPROACH FOR MONITORING ENERGY CONSUMPTION AND PREVENTIVE MAINTENANCE OF A SYSTEM BASED ON CONTROL LOOP EFFICIENCY

(75) Inventors: Thirumal Raman, Coimbatori (IN); Jagadeesh S, Trichy (IN); Divya Devi C, Coimbatore (IN)

(73) Assignee: Honeywell International Inc., Morristown, NJ (US)

( * ) Notice: Subject to any disclaimer, the term of this patent is extended or adjusted under 35 U.S.C. 154(b) by 331 days.

(21) Appl. No.: 12/969,464

(22) Filed: Dec. 15, 2010

(65) Prior Publication Data

US 2012/0158361 A1    Jun. 21, 2012

(51) Int. Cl.
*G06F 15/00* (2006.01)
(52) U.S. Cl.
USPC .............. 702/183; 700/100; 700/106; 700/36
(58) Field of Classification Search
USPC .............. 702/183; 700/21, 28, 36, 44, 45, 46, 700/100, 106, 108; 715/5, 6, 7.38
See application file for complete search history.

(56) References Cited

U.S. PATENT DOCUMENTS

| | | | |
|---|---|---|---|
| 4,380,146 A * | 4/1983 | Yannone et al. | 60/790 |
| 5,323,368 A * | 6/1994 | Semba | 369/30.17 |
| 5,754,451 A | 5/1998 | Williams | |
| 6,038,540 A * | 3/2000 | Krist et al. | 705/7.33 |
| 6,298,454 B1 * | 10/2001 | Schleiss et al. | 714/37 |
| 6,615,090 B1 * | 9/2003 | Blevins et al. | 700/26 |
| 6,633,782 B1 * | 10/2003 | Schleiss et al. | 700/26 |
| 6,993,396 B1 * | 1/2006 | Gerry | 700/36 |
| 7,024,336 B2 * | 4/2006 | Salsbury et al. | 702/182 |
| 7,248,263 B2 | 7/2007 | Freeman et al. | |
| 8,073,074 B2 * | 12/2011 | Waheed et al. | 375/297 |
| 2007/0185686 A1 * | 8/2007 | Singhal et al. | 702/185 |
| 2010/0289430 A1 * | 11/2010 | Stelzer et al. | 315/307 |
| 2011/0095897 A1 * | 4/2011 | Sutrave | 340/635 |
| 2011/0188543 A1 * | 8/2011 | Van de Beek et al. | 375/135 |
| 2011/0272117 A1 * | 11/2011 | Hamstra et al. | 165/45 |

* cited by examiner

*Primary Examiner* — Carol S Tsai
(74) *Attorney, Agent, or Firm* — Seager Tufte & Wickhem LLC.

(57) ABSTRACT

An approach for monitoring energy consumption and detecting preventive maintenance issues in a system having control loops and associated devices. Settling time and error value in a control loop may be indicative of the loop's efficiency. Error value may be a difference between a measurement of a parameter and a setpoint for the parameter. Degradation of a loop's efficiency may be an indication of increased energy consumption by the system. Such degradation may also be indicative of a future defect in a control loop or devices associated with the control loop. Thus, the present approach may provide for energy monitoring and preventive maintenance of the system.

19 Claims, 18 Drawing Sheets

APPROACH FOR MONITORING ENERGY CONSUMPTION AND PREVENTIVE MAINTENANCE OF A SYSTEM BASED ON CONTROL LOOP EFFICIENCY

BACKGROUND

The present disclosure pertains to controllers and particularly to industrial and building controllers. More particularly, the disclosure pertains to control loops of the controllers.

SUMMARY

The disclosure reveals an approach for monitoring energy consumption and detecting preventive maintenance issues in a system having control loops and associated devices. Settling time and error value in a control loop may be indicative of the loop's efficiency. Error value may be a difference between a measurement of a parameter and a setpoint for the parameter. Degradation of a loop's efficiency may be an indication of increased energy consumption by the system. Such degradation may also be indicative of a future defect in a control loop or devices associated with the control loop. Thus, the present approach may provide for energy monitoring and preventive maintenance of the system.

DESCRIPTION

Figure 1:
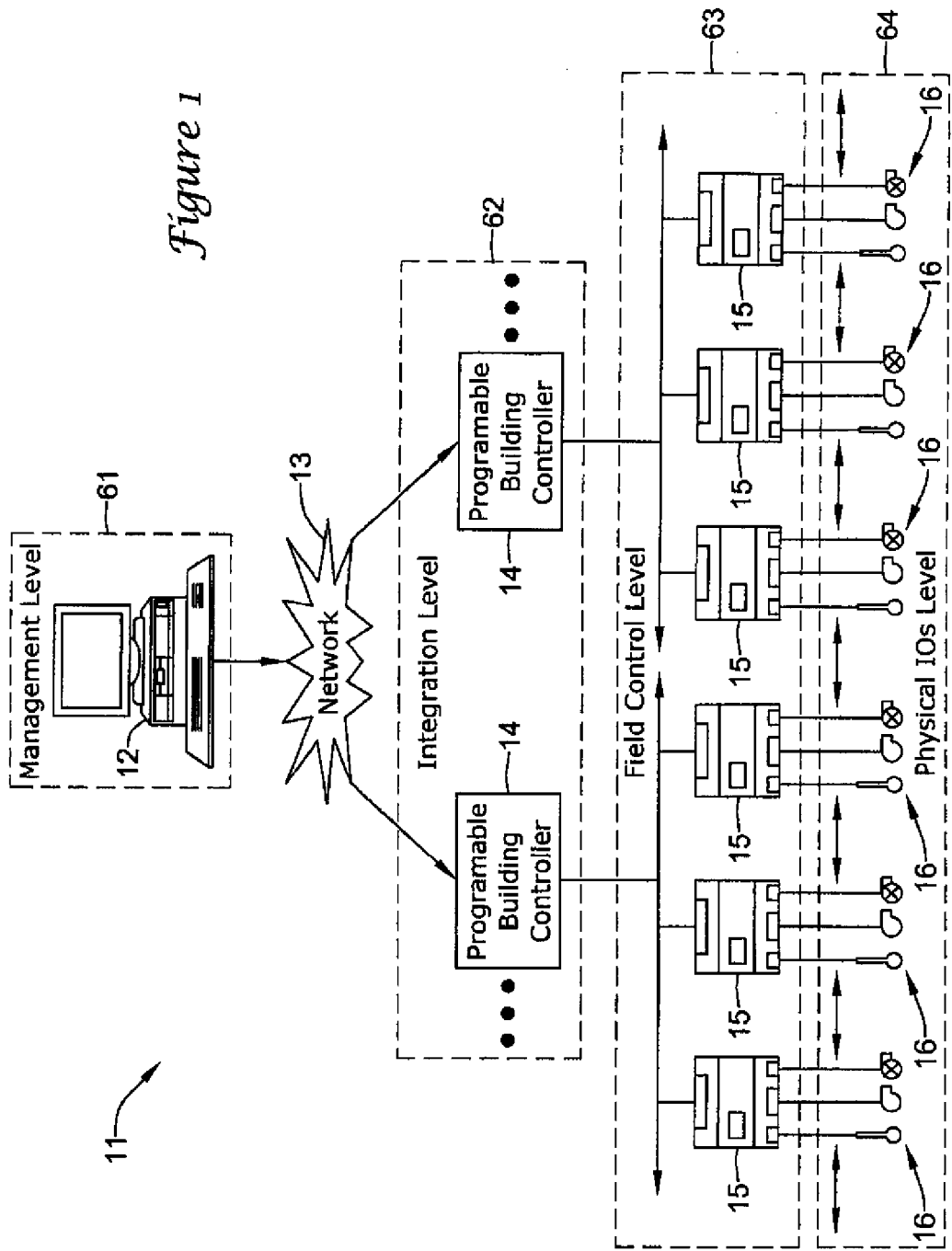
FIG. 1 is a diagram of a system designed to compute the condition of its controllers and associated devices.

Energy consumption in control systems may be due to controllers and devices in the system. Energy consumption has become a critical component in industrial and building control systems since much energy may be consumed by these systems. It may be critical to maintain the energy consumption of the devices within a tolerance limit. Due to performance degradation and aging, the energy consumed by the control system may increase exponentially. The following points may appear to be more pro-dominant in the industry.

One may want to ensure the constant energy consumption of a controller/device throughout its lifetime without monitoring the energy, to ensure "Leadership in Energy and Environmental Design Services" (LEEDS) compliance of the controller power consumption throughout its lifetime, to identify early wear/tear out issues in field devices, and to do continuous commissioning for the devices. LEEDS is an internationally recognized green building certification system which may provide third-party verification that a building or community may be designed and built using strategies aimed at increasing performance, saving energy, reducing waste, and so on.

The present approach may be a solution to issues relating to energy consumption. Energy consumption of a control system may consist of two parts. One part may be static energy consumption which is energy consumed during the idle operation of controllers/devices. Another part may be dynamic energy consumption which is energy consumed while the controllers/devices are operating/driving any external devices to match the actual value with the setpoint value. Thus, total energy consumption in a control system may equal static plus dynamic energy consumption.

The static energy consumption appears less since in an idle state, the system may be performing very minimum operations but in a dynamic state it may be operating to control the devices and to execute an algorithm at a fullest extend. Most of the energy consumption may happen in a dynamic state since it is controlling the external devices. By considering this, total energy consumption in a control system may be approximately equal to the dynamic energy consumption in the control system.

Energy consumption in the dynamic state may purely depend on the power required to control the field devices. Dynamic energy consumption may be directly proportional to an amount of time taken to drive the field devices. The settling time of each control loop may determine the field device driving\controlling time. Settling time in a control loop depends upon an error value. Thus, by monitoring both settling time and error value in an individual control loop, it may be identified whether a controller/device consumes more power than the amount of power for which it is designed. Both settling time and error value may be identified relative to a single parameter called control loop efficiency. Thus, by monitoring the control loop efficiency, it may be determined whether the controller/device consumes more power than for which it is designed.

If there is any performance degradation due to aging, there may be a negative impact on the settling time (i.e., the settling time will be increased). An increase in settling time may result in an increase in the energy consumption. So by continuously monitoring the control loop efficiency, the energy consumption may be tracked. This energy consumption monitoring may be used to adhere to the LEEDS certification requirements.

The same logic may also be applied to preventive maintenance. The present approach may be indicative of health of the controller, and its control loops and devices. Any degradation in control loop efficiency may infer a future defect in the control loop or devices subject to the control loop. Thus, necessary steps may be taken to rectify issues in the devices before they reach a failure mode.

FIG. 1 is a diagram of a system 11 for incorporating the present approach. A central station 12 may perform virtually all of the operations. Central station 12 may monitor settling time and error value of each control loop. Control loop efficiency can be calculated based upon the settling time and error value samples. If the control loop efficiency deviates from a specified tolerance limit, then the system may identify it as the system consumes more energy.

Central station 12 may compute control loop efficiencies. Station 12 may monitor both setpoint and actual values of individual control loops. At a management level 61, station 12 may monitor each control loop performance index. Based upon a controller performance index, station 12 may provide suggestions to the user. An energy compliance and preventive maintenance service may run at management level 61.

At an integration level 62, there may be programmable building controllers 14. The controllers may be of another kind such as industrial controllers. Building controllers 14 may be connected to station 12 via an internet 13 or other networking medium. Field controllers 15 may be connected to each building controller 14 at a field control level 63. Each field controller 15 may be connected to sensors, fans and other equipment 16 at a physical IO (input/output) level 64.

An algorithm may be utilized for determining and monitoring control loop performance indexing. The algorithm may incorporate the following items: 1) Identify each control loop in the system; 2) Collect samples of an actual value in each control loop at one sample per unit time rate (this rate may be adjusted based upon the system characteristics); 3) Calculate each control loop performance index over the collected samples (calculation of control loop performance index should be performed at a periodic interval); 4) Identify whether the control loop performance index is degraded (if the control loop performance index is degrading, then there might be a chance of performance degradation in field devices); and 5) Repeat the above items starting from item 2. An example unit time may be five minutes.

Formulas may be derived to identify control loop performance index with just two input variables. Other approaches may have significant targets concerning comparisons with the threshold values for the normal operation and abnormal operation. The present approach does not necessarily require any such kind of information and it may just require an actual value and a setpoint value of the control loop. A formula for this determination may be relatively elegant.

Figure 2:
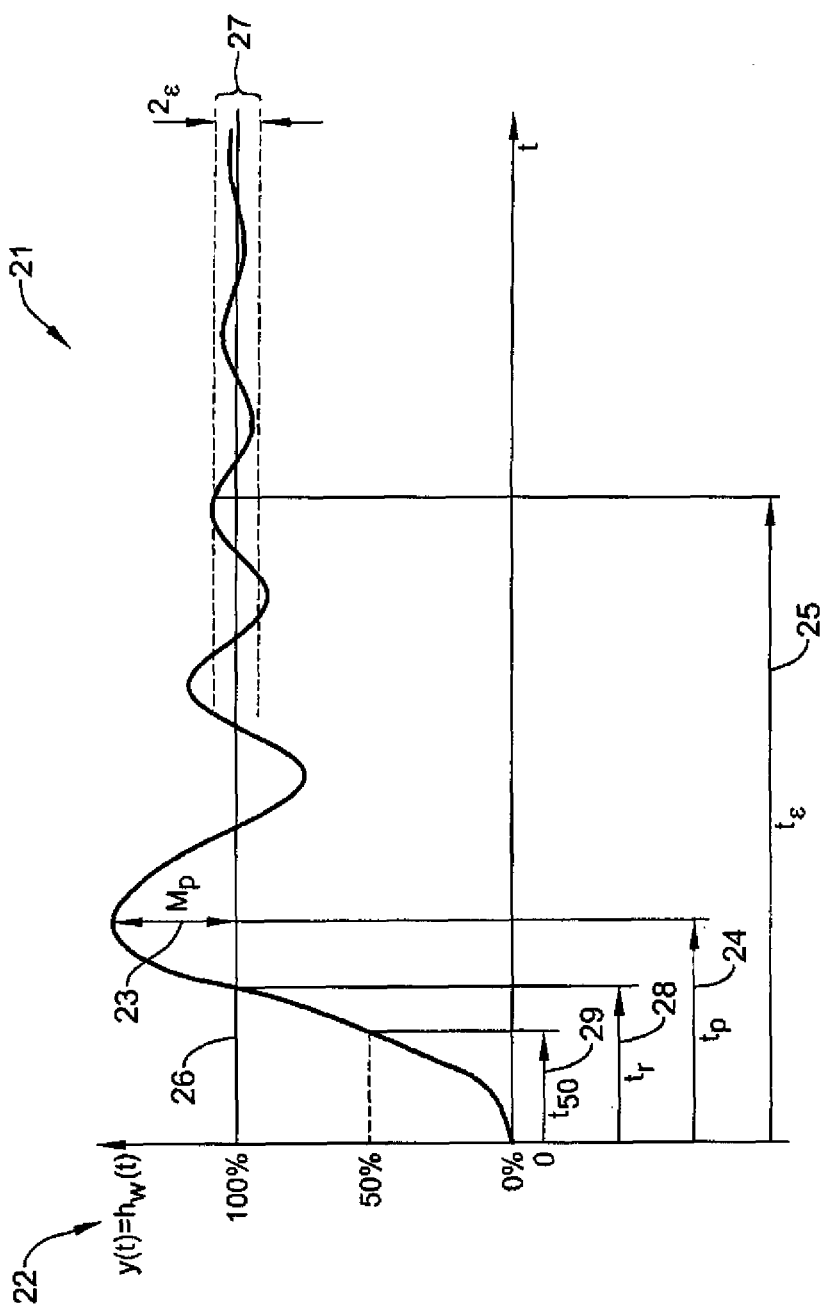
FIG. 2 is a diagram illustrative of items relevant to determining control loop performance index.

FIG. 2 shows a diagram 21 illustrative of items based upon an algorithm from which a control loop performance index may be calculated. Specifications for a control system design may often involve certain requirements associated with a time response of a closed-loop system. The requirements may be specified by the behavior of a controlled variable y(t) or by a control error e(t) on well-defined test signals. A very important test signal may be a unit step on an input of the control system. Requirements may be placed on the behavior of the controlled variable $y(t)=h_w(t)$, as shown at axis 22 in FIG. 2. Requirements for a unit step response may be expressed in terms of the following standard quantities. A maximum overshoot $M_p$ may be a magnitude 23 of the overshoot after the first crossing of the steady-state value (100 percent) 26. This value may normally be expressed as a percentage of the steady-state value of the controlled variable. The peak time $t_p$ may be the time 24 required to reach the maximum overshoot. The settling time $t_\epsilon$ may be the time 25 for the controlled variable first to reach and thereafter remain within a prescribed amount $\pm\epsilon$ (magnitude 27) of the steady-state value 26. Common values of $\epsilon$ may be 2 percent, 3 percent, 5 percent or other percent of the value or magnitude 26. The rise time $t_r$ may be the time 28 required to reach first the steady-state value (100 percent) 26. The rise time ($t_r$) 28 may instead be defined as the time to reach the vicinity of the steady-state value 26 particularly for a response with no overshoot, e.g., the time between 10 percent and 90 percent of value 26. A 50 percent rise time $t_{r,50}$ may be defined as the time 29 to go from 0 percent to first reach 50 percent of the final value 26.

A key parameter that may define a control loop response may be a settling time (Ts). A formula for settling time can be given as:

$$Ts = \frac{\ln(\%\ Errorvalue)}{\zeta \omega_n},$$

where $\zeta$ is a damping ratio (i.e., the damping ratio may provide a mathematical approach for expressing a level of damping in a system and determining which one of the cases herein is in effect. The damping ratio may be defined as a ratio of the damping constant to the critical damping constant).

A performance index in a control loop may indicate how effectively (including both response time and error value) a controlled variable in the control loop may settle in its setpoint if there is any disturbance in the control loop input and/or feedback. Effectiveness in response time may indicate how reliably it is maintaining its settling time in making the control variable reach its setpoint value. The effectiveness in response time may be measured with the aid of a coefficient of variation (CV). Effectiveness in error value may mean the ability of the control loop to keep the error value to almost zero if there are no disturbances in the environment.

A performance index of a control loop may be mainly based on settling time (Ts) and error value, and in turn the error value may be based upon a current point value and setpoint.

With these analyses and considered parameters, a formula may be derived to calculate the efficiency of a control loop. An average of all of the control loop efficiencies may be regarded as the efficiency of a controller.

A control loop performance index may be determined as follows:

$$D_i = \sqrt{\frac{\sum (x_i - Setpoint_i)^2}{N}} \text{ and}$$

$$PI_i = 1 - \left( \frac{D_i}{1 - \left(\frac{\sigma(Setpoint)}{\mu(Setpoint)}\right)} \right),$$

where $D_i$ is a deviation an $i^{th}$ sample from the setpoint value, $x_i$ is an actual value of an $i^{th}$ sample, $Setpoint_i$ is a setpoint value of an $i^{th}$ sample, $PI_i$ is a performance index of an $i^{th}$ sample, N is a number of samples, $\mu$ is a mean, and $\sigma$ is a standard deviation.

A controller performance index may be determined as follows:

$$D_C = \sqrt{\frac{\sum (D_{CLi} - 100)^2}{N}} \text{ and}$$

$$PI_C = 1 - (D_C),$$

where $D_c$ is a controller deviation, $D_{CLi}$ is a deviation in an $i^{th}$ control loop, $PI_c$ is a controller performance index, and N is a number of control loops.

A performance index of a building controller may be a standard deviation of loop performance indices of the entire one or more control loops of the building controller where the mean is 100.

Different approaches to calculate a control loop performance index may be a cumulative PI computation, an individual sample PI computation, and a sliding window PI computation with a fixed sample length. Among these approaches, the cumulative PI computation may inherit an issue of introducing delay and not necessarily be very responsive to the error value variation. The sliding window approach may also have the herein mentioned issue which may be overcome by providing a minimum/optimized window length. A good choice appears to be the individual sample PI computation in that it may provide an immediate PI change to any change in the error.

Figure 3A:
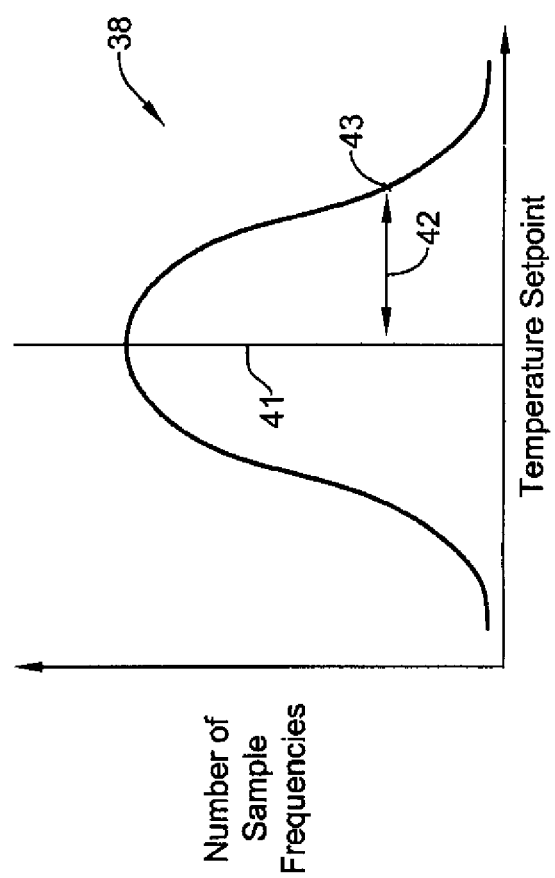
FIGS. 3a and 3b are graphs showing a frequency of samples versus temperature deviation illustrating a sample with a deviation and a sample with deviation, respectively.

FIG. 3a is a diagram of a graph 38 with a number of samples—frequency versus temperature deviation. An actual room temperature may be equal to setpoint temperature plus or minus a deviation of temperature. The temperature setpoint may be indicated by line 41. Line 42 may represent $D_i$ which is a deviation of an $i^{th}$ sample 43. An inverse of $D_i$ will be performance index $PI_i$ of the $i^{th}$ sample.

Figure 3B:
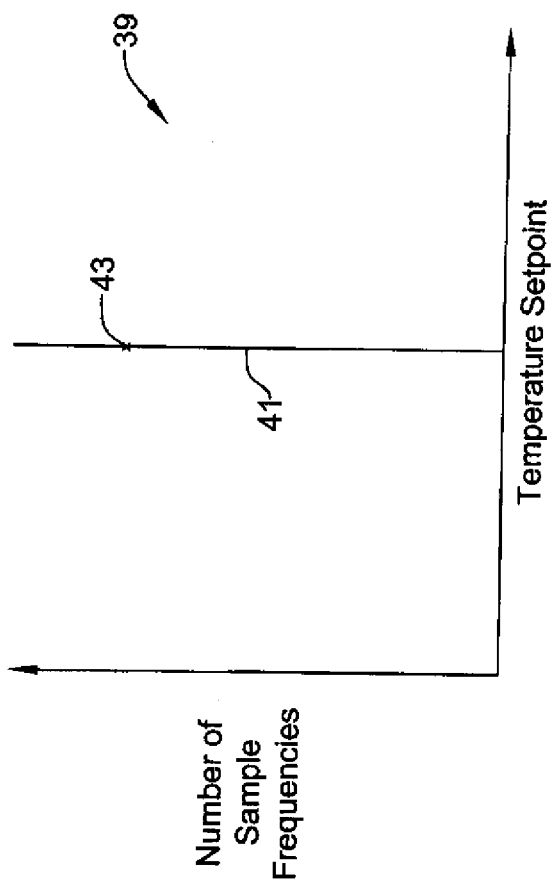

FIG. 3b is a diagram of a graph 38 with a number of samples—frequency versus temperature deviation. Line 41 may represent the temperature setpoint. It may be noted that $D_i$ (deviation 42) is zero for $i^{th}$ sample 43. When the deviation 42 ($D_i$) is zero, then the room setpoint temperature is equal to the room actual temperature.

Any deviation in error value may cause a reduction in the control loop performance index. In the present formula, a control loop may be considered as a black box, and thus no threshold and reference values are referred to calculate the PI of the loop. Without having the threshold and reference values on settling time, the efficiency may be calculated by using the ratio of standard deviation and the mean of the samples taken in a user mentioned time window. By considering all of the control loop efficiencies, the controller efficiency may be computed.

A control loop performance index may be reduced from the designed spec due to issues in the devices that are connected to the control loop. While continuously monitoring the control loop efficiency, it may be determined whether the control loop devices are having any issues. This approach may also indirectly address the energy efficiency issue. If the devices have an issue (e.g., wear out), the control loop may still perform its operation but the power consumed by the devices will likely increase and it will operate for more time to meet the setpoint value. By monitoring the control loop efficiency, preventive maintenance may be taken care of to reduce or avoid failure of devices and to ensure the energy efficient control system.

Figure 4:
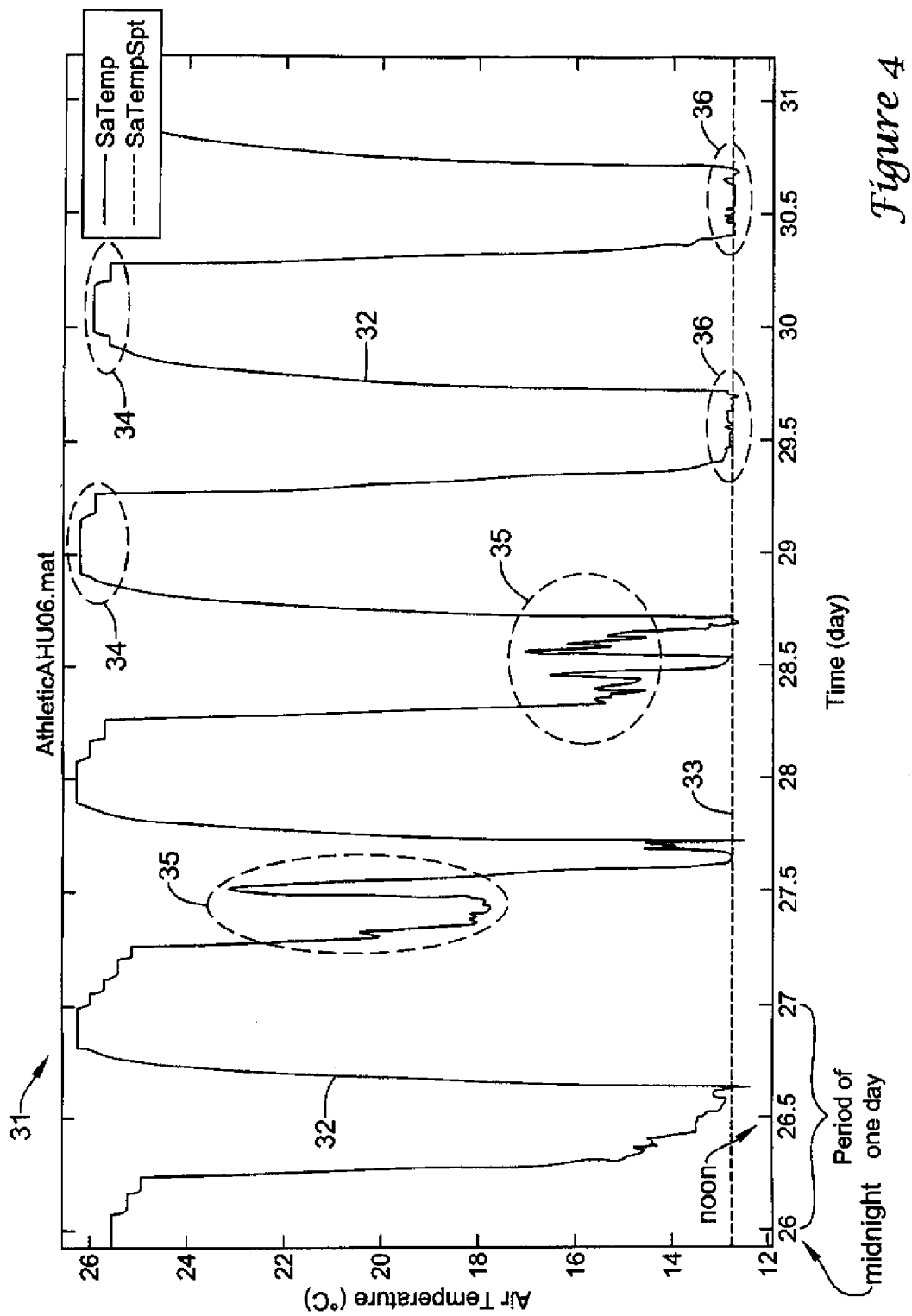
FIG. 4 is a graph of air temperature versus time and day with a curve indicating air temperature and a line indicating a temperature setpoint.
Figure 5A:
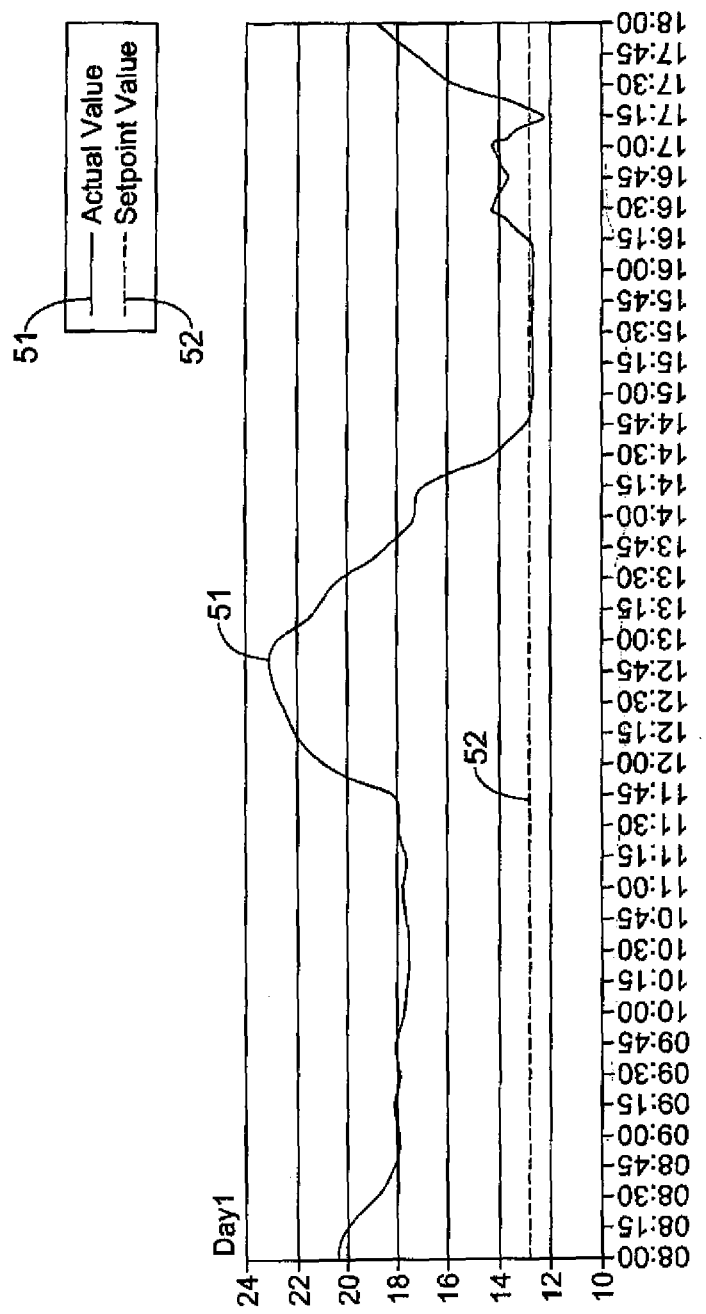
FIGS. 5a-8b are graphs of site values evaluation for a sequence of days, and for field data validation.
Figure 5B:
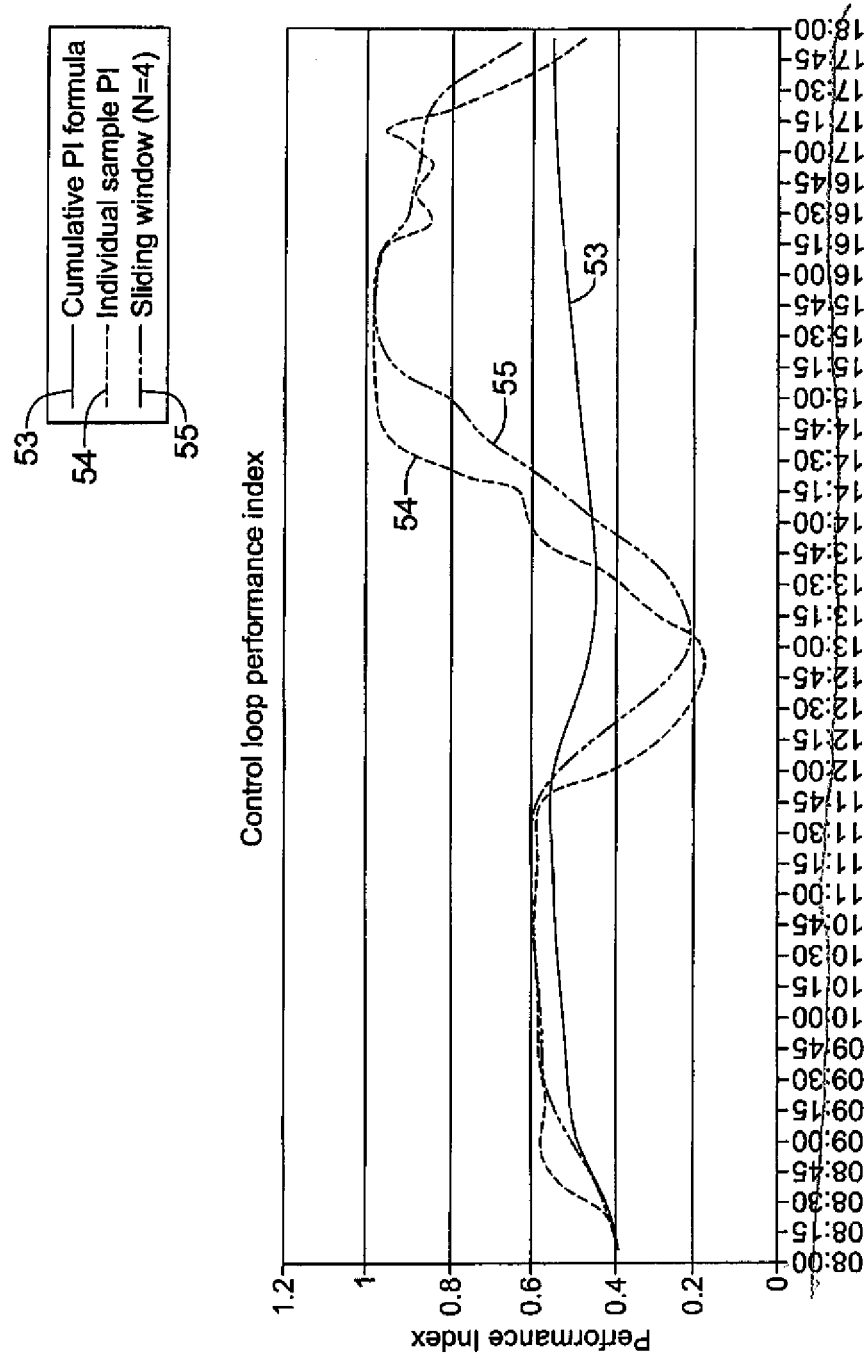
Figure 6A:
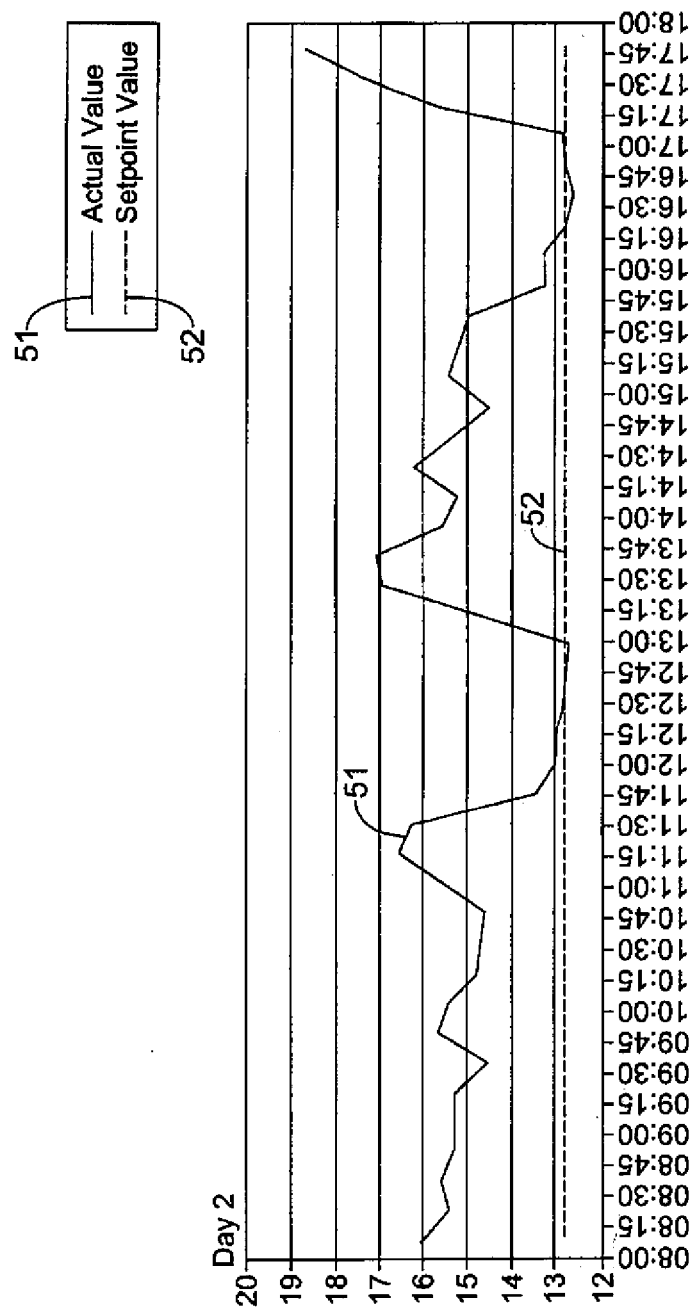
Figure 6B:
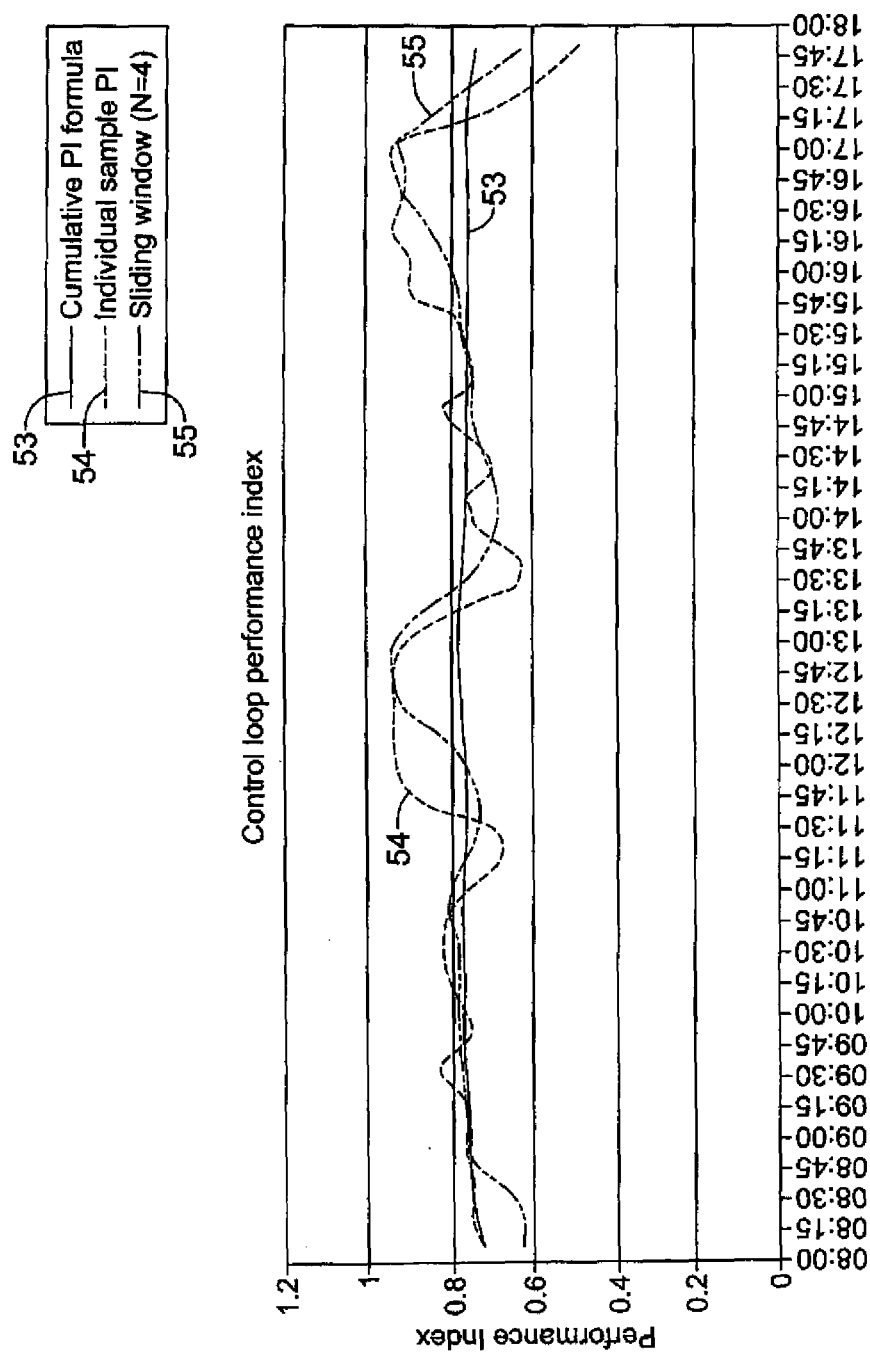
Figure 7A:
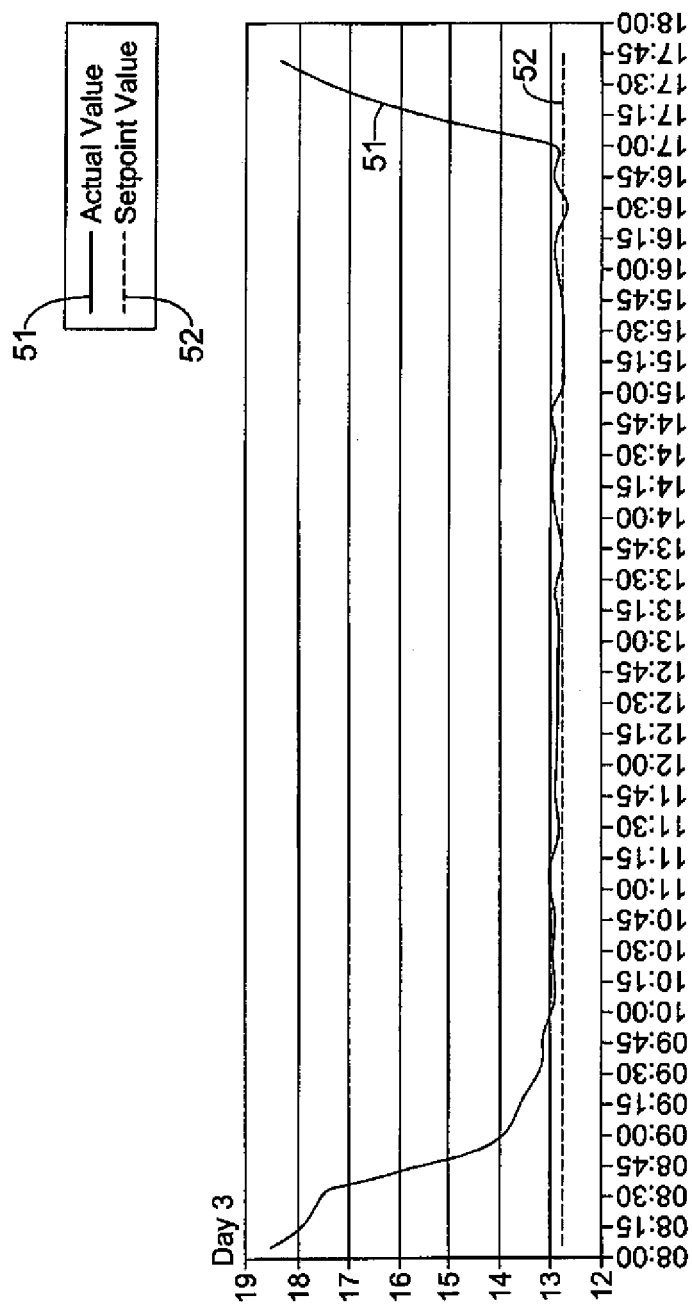
Figure 7B:
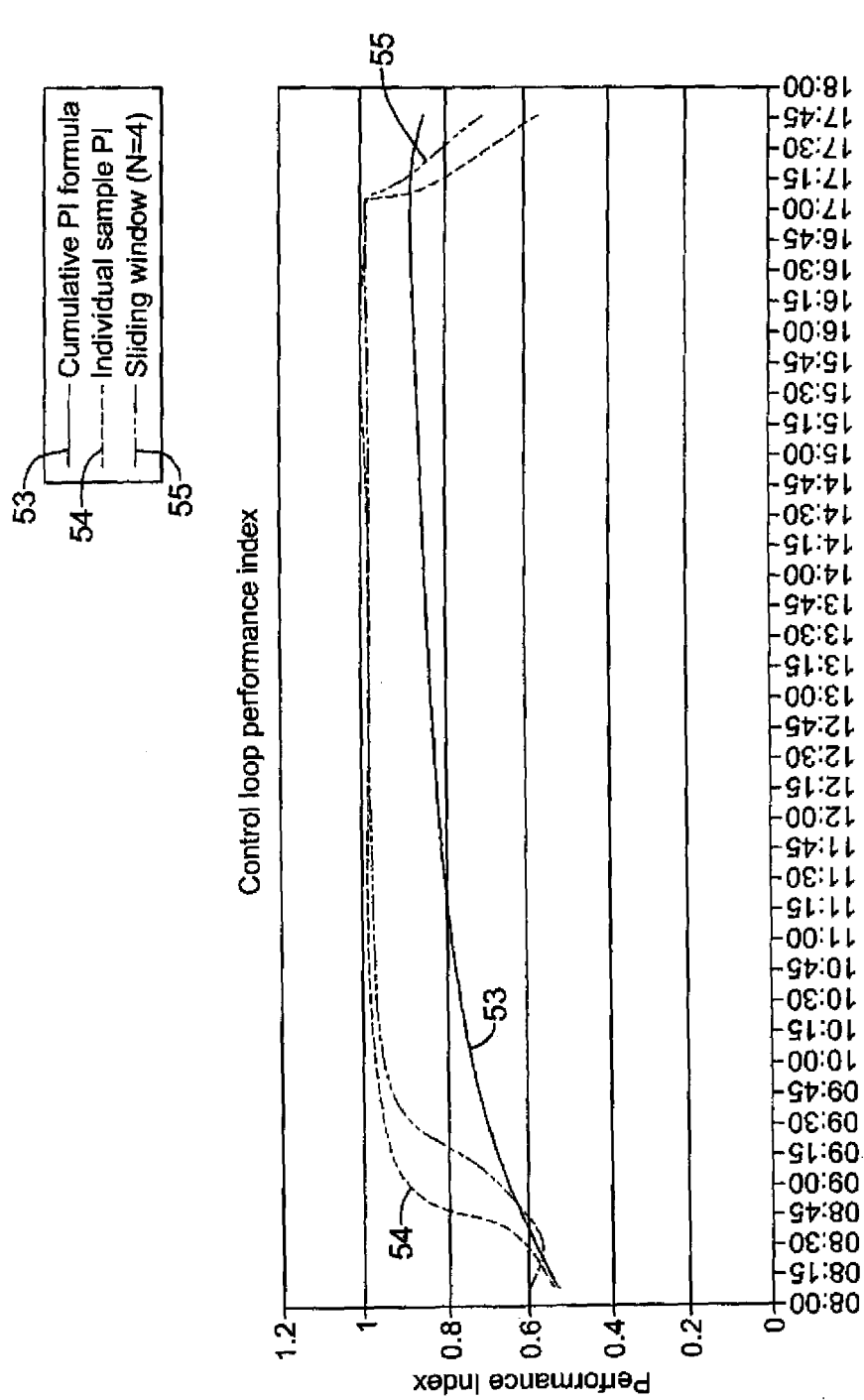
Figure 8A:
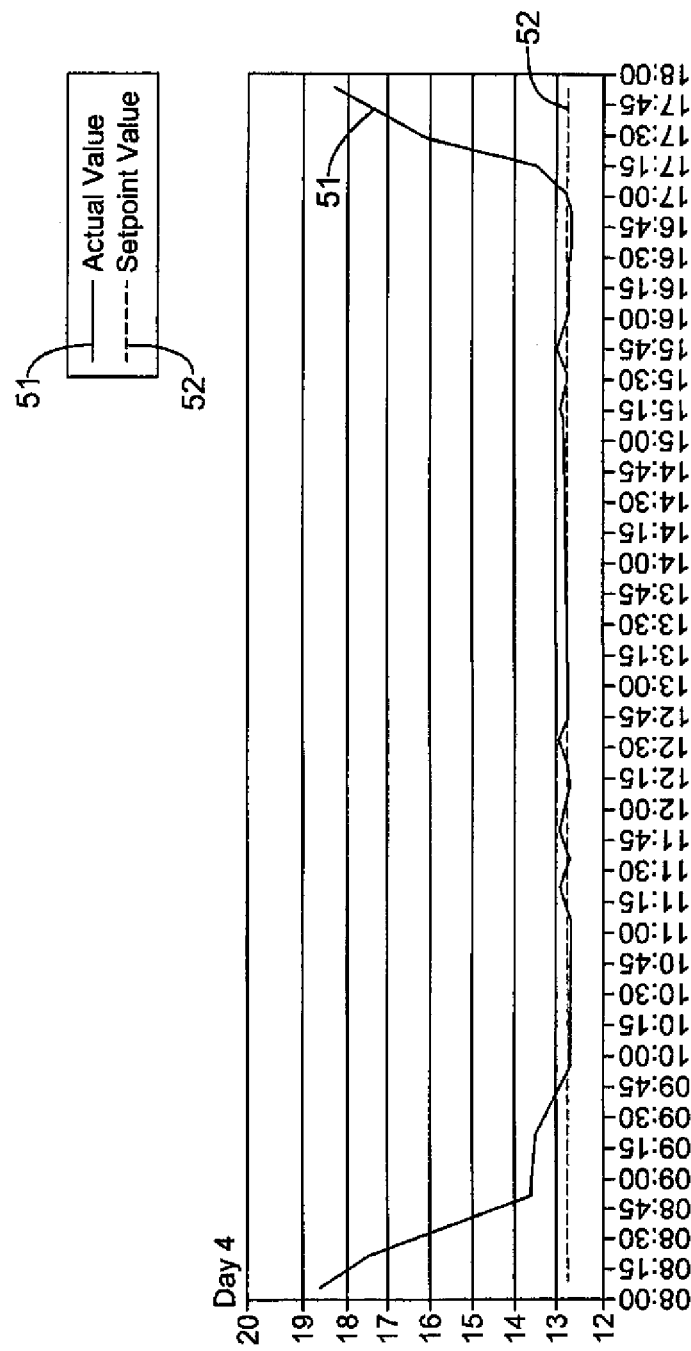
Figure 8B:
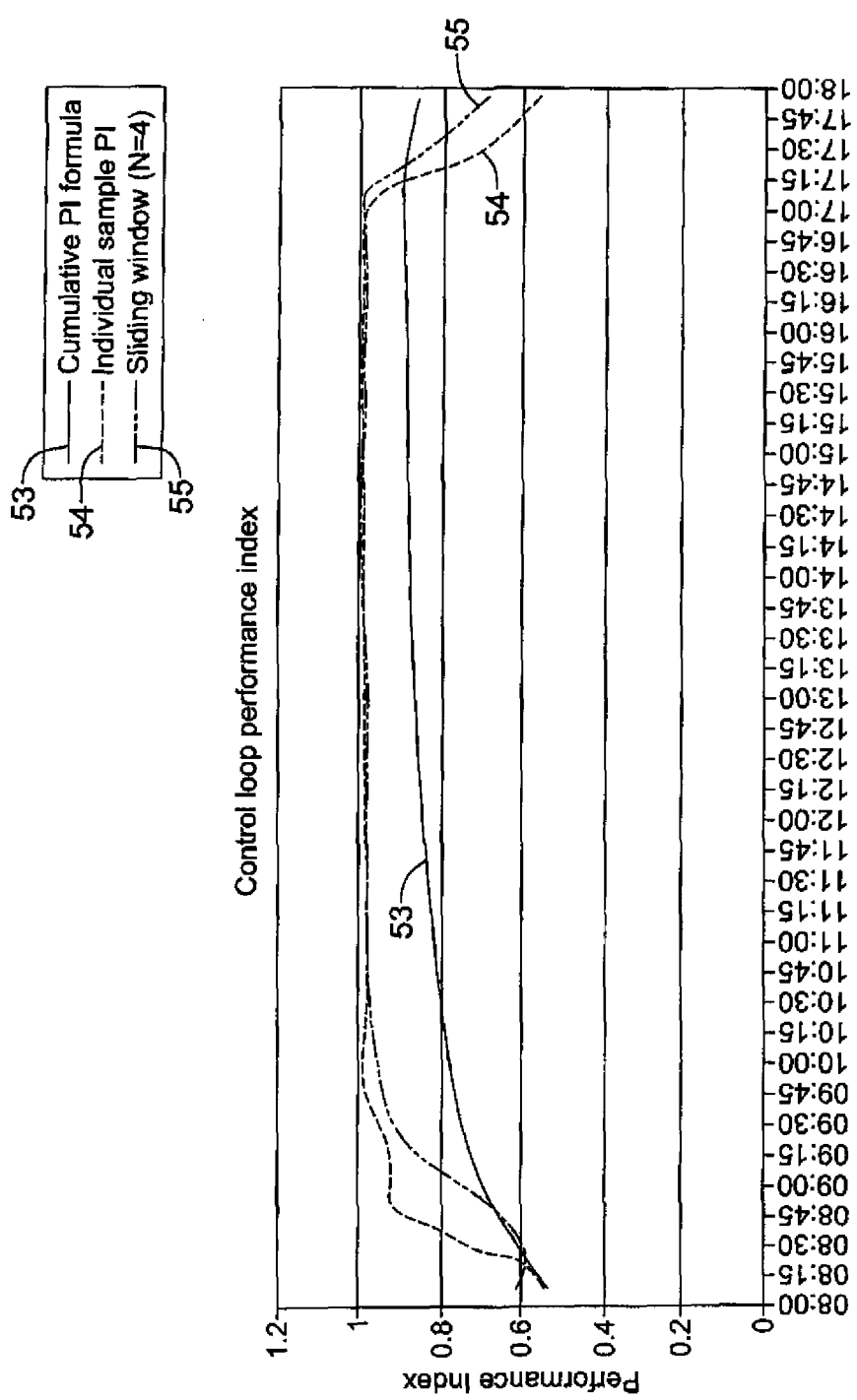
Figure 9:
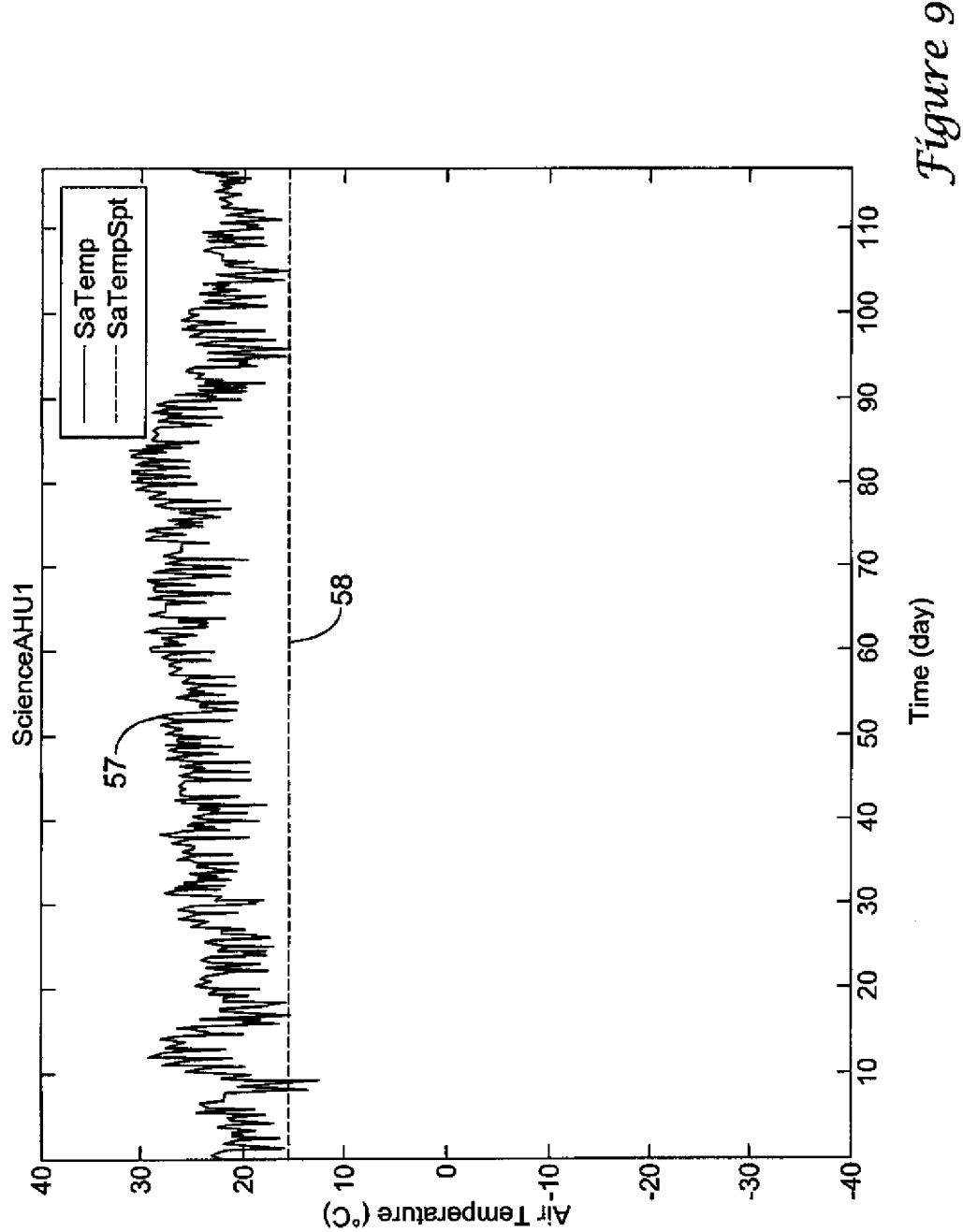
FIGS. 9-13 are graphs illustrating various scenarios of air temperatures relative to air temperature setpoints.
Figure 10:
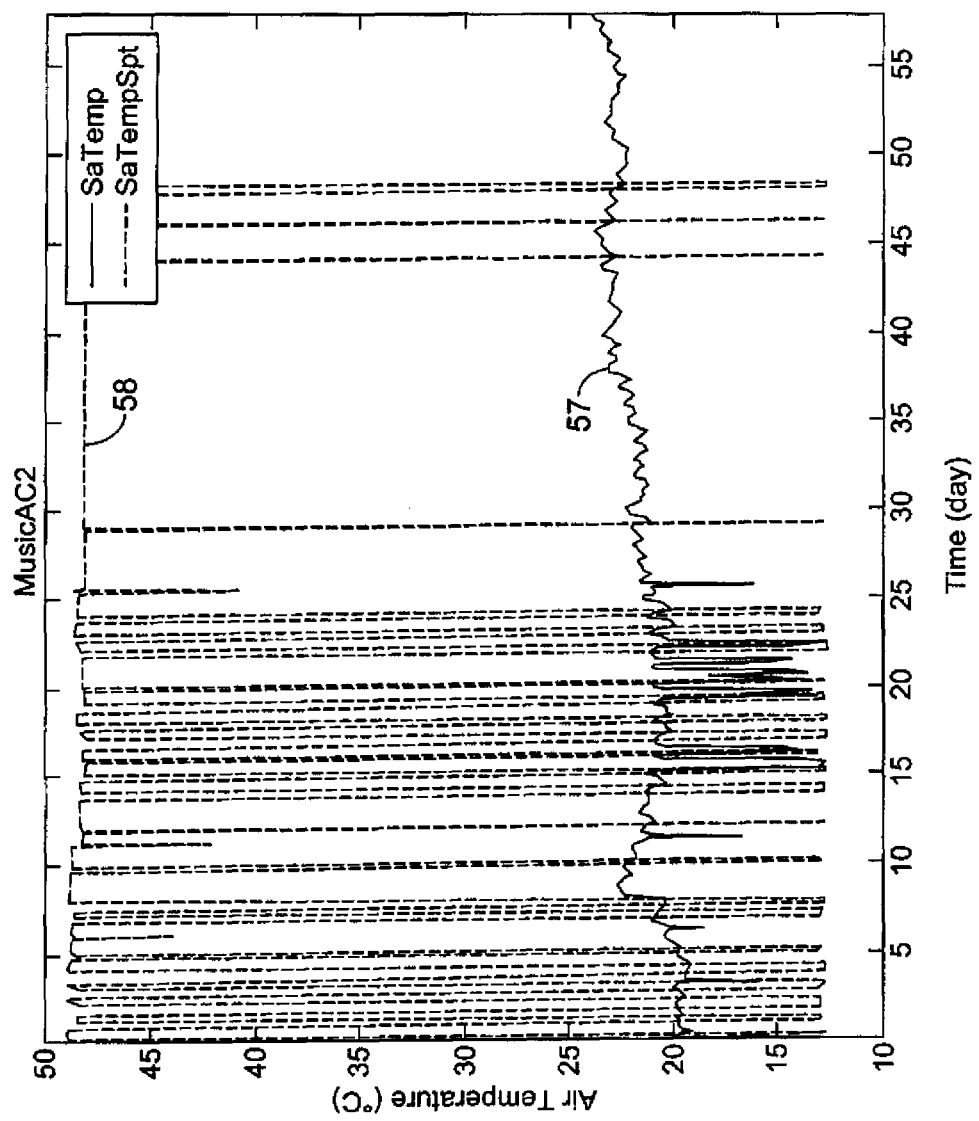
Figure 11:
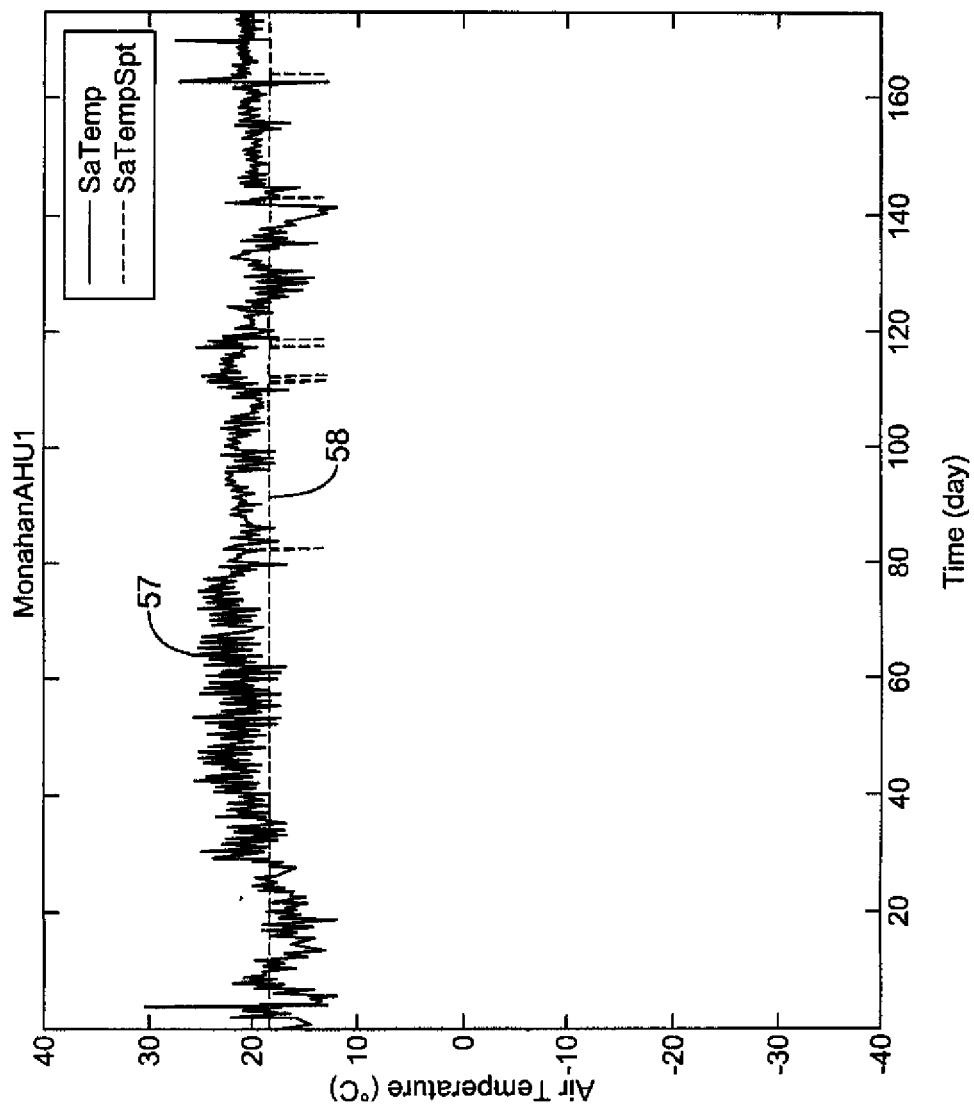
Figure 12:
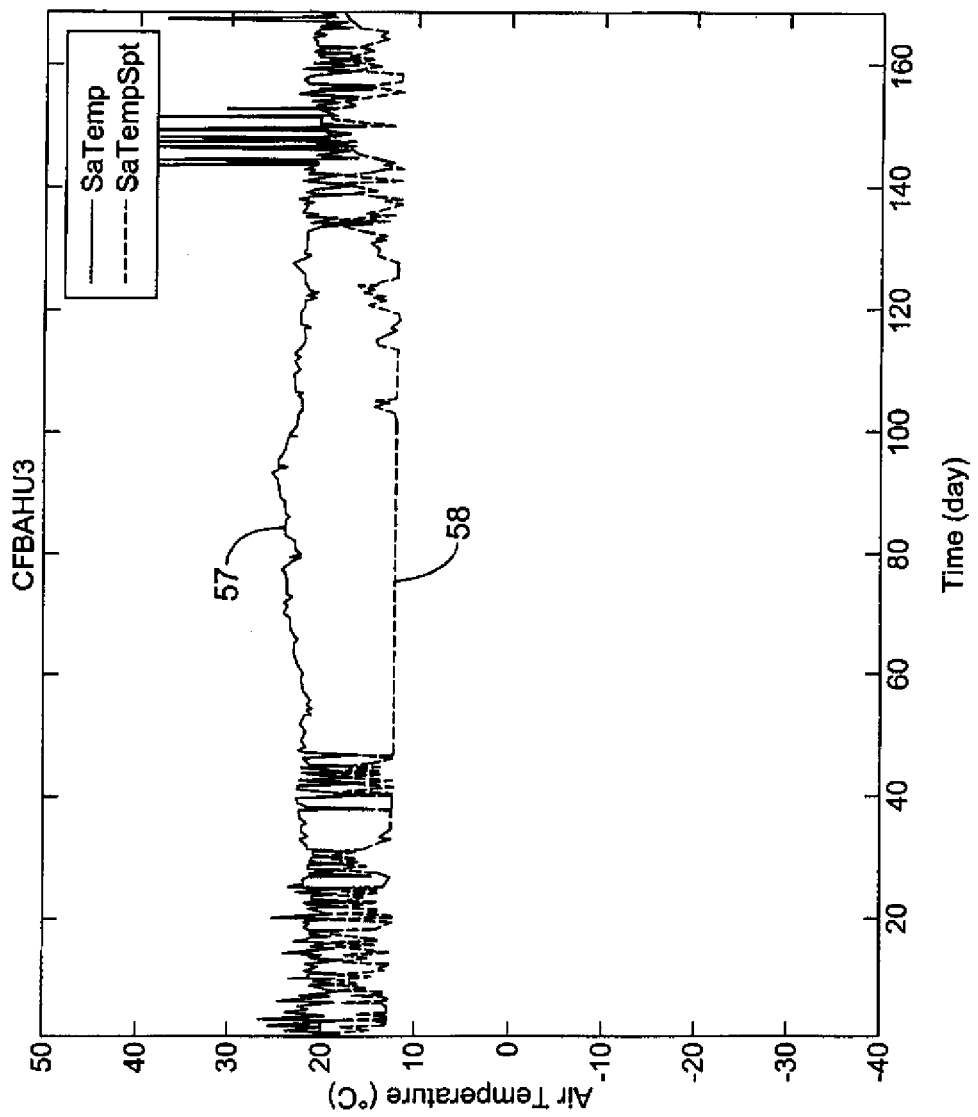
Figure 13:
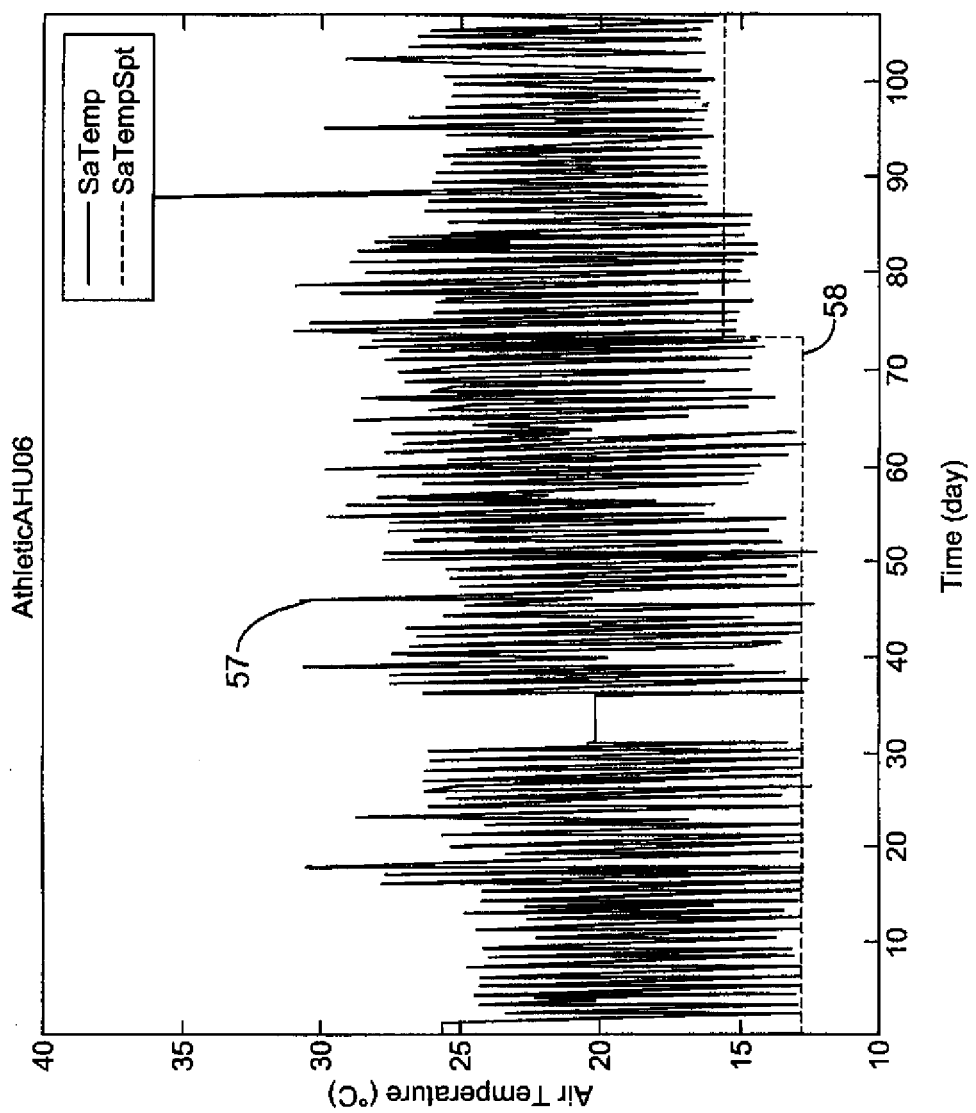

FIG. 4 is a diagram of a zoomed view of a field data validation plot 31. The graph may represent air temperature (degrees C.) versus time and day. Curve 32 may represent the supply air temperature and line 33 may represent the supply air temperature setpoint. The setpoint may typically be set to be met between 8 AM to 6 PM (i.e., time of day from 0.33 to 0.75). Night operation, as indicated by dashed-line symbols 34, does not necessarily have a need to meet a setpoint. Waveform shape or behavior may indicate whether the setpoint has been met or not. The waveforms indicated by dashed-line symbols 35 may indicate wrong behavior which means that the setpoint has not been appropriately met. The waveforms indicated by dashed-line symbols 36 may indicate correct behavior which means that the setpoint has been appropriately met.

FIGS. 5a, 5b, 6a, 6b, 7a, 7b, 8a and 8b are graphs of site values evaluation for a sequence of four days. FIGS. 5a, 6a, 7a and 8a reveal an actual temperature value with curve 51 and setpoint value 52 over a period from 08:00 to 18:00 for each of the four days, respectively, for a particular location. The temperature indications are in degrees C. FIGS. 5b, 6b, 7b and 8b are graphs of site values evaluation for the same four days as FIGS. 5a, 6a, 7a and 8a, respectively, of the particular location. In each of the graphs, curve 53 represents the cumulative performance index (PI) formula, curve 54 represents the individual sample PI, and curve 55 represents a sliding window (N=4).

FIGS. 9-13 are graphs of air temperature versus time (day) with field data validation. The graphs represent scenarios of different supply air temperatures 57 and various supply air temperature setpoints 58. The temperature ranges and time periods appear different among the Figures. The graphs may reveal interesting aspects in terms of results, characteristics, dynamics, diagnostics, and so on about the control loops and controllers.

Benefits of the present approach may be as in the following. The present system may be used for any control loop and for any controller. The efficiency calculation may help to find out a wear out issue in the devices. If the controller efficiency is decreasing, it may indicate that there might be an issue in the device. There may be energy efficiency. Preventive maintenance may be available. There may be LEEDS sustenance. There may be continuous commissioning. The present approach may provide the first step for control loop fine tuning and continuous commissioning.

The present approach may be used to monitor the energy compliance in order to ensure the energy consumption of devices throughout a system's lifetime without any additional hardware. Preventive maintenance may be identified without any additional hardware and any device specifications. The present approach may help to achieve the system to operate within the specified energy range so that the LEEDS requirements can be met and sustained. Controller efficiency may be calculated in a central (server) station. The approach may be integrated in any central (server) station, which is capable of capturing trends for a given point.

The controller may consist of multiple control loops. By calculating the efficiency of each control loop, the controller efficiency may be calculated upon. The present approach may be added as a feature in Honeywell BOS (Building Optimization Services). Continuous commissioning may be a first step for control loop fine tuning and continuous commissioning.

Another approach may identify a fault by inspecting the variable current state and identifying the fault condition. The present approach does not necessarily check the current state of the variable but instead may check the control loop efficiency with the help of two parameters to identify a faulty condition of the control loop.

Some approaches may identify predefined threshold values and predefined rules or predefined economic factor values. The present approach does not necessarily use any predefined threshold values to determine a health/efficiency of a control loop. The present approach may use a statistical convention aspect with available parameter samples in a herein mentioned time window, to calculate the health/efficiency of the control loop.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. An approach for controller evaluation comprising:
providing a controller having one or more controller loops;
operating the one or more controller loops;
measuring settling times of the one or more control loops;
monitoring error values of the one or more control loops; and
determining control loop efficiencies of the one or more control loops from the settling times and error values, respectively; and wherein the settling times are times it takes the one or more control loops to reach a prescribed amount of a setpoint value.

2. The approach of claim 1, further comprising tracking energy consumption from a control loop efficiency.

3. The approach of claim 2, wherein an increase of energy consumption implies a potential defect in the one or more control loops.

4. The approach of claim 2, wherein tracking energy consumption is a basis for meeting LEEDS certification requirements.

5. The approach of claim 3, wherein a potential defect in one or more control loops is a basis for rectifying issues in one or more control loops or in one or more devices subject to the one or more control loops.

6. The approach of claim 1, wherein control loop efficiencies of the one or more control loops are determined from control loop performance indexing.

7. The approach of claim 6, wherein control loop performance indexing comprises:
   identifying each control loop of the one or more control loops;
   collecting samples of an actual value in each of the one or more control loops at one sample per unit time;
   calculating a control loop performance index for each of the one or more control loops from the samples;
   identifying one or more performance indices which have degraded; and
   checking devices for performance degradation, of the one or more control loops having a performance index which has degraded is an indication of potential performance degradation for field devices connected to the respective one or more control loops.

8. The approach of claim 7, wherein the control loop performance indexing further comprises repeating one or more times as desired the following:
   collecting samples of an actual value in each of the one or more control loops;
   calculating a control loop performance index for each of the one or more control loops from the samples;
   identifying one or more of the performance indices which have degraded; and
   checking devices for performance degradation, of the one or more control loops which have degraded.

9. The approach of claim 6, wherein control loop performance indexing is determined from formulas comprising:

$$D_i = \sqrt{\frac{\sum (x_i - Setpoint_i)^2}{N}} \; ; \text{ and}$$

$$PI_i = 1 - \left(\frac{D_i}{1 - \left(\frac{\sigma(Setpoint)}{\mu(Setpoint)}\right)}\right); \text{ and}$$

wherein:
   $D_i$ is a deviation of an $i^{th}$ sample from the setpoint value;
   $x_i$ is an actual value of an $i^{th}$ sample;
   $Setpoint_i$ is a setpoint value of an $i^{th}$ sample;
   $PI_i$ is a performance index of an $i^{th}$ sample;
   N is a number of samples;
   $\mu$ is a mean; and
   $\sigma$ is a standard deviation.

10. The approach of claim 1, wherein:
   the one or more controller loops are at least a portion of a controller; and
   a controller performance index is determined from formulas comprising:

$$D_C = \sqrt{\frac{\sum (D_{CLi} - 100)^2}{N}} \text{ and}$$

$$PI_C = 1 - (D_C); \text{ and}$$

wherein:
   $D_c$ is a controller deviation;
   $D_{CLi}$ is a deviation in an $i^{th}$ control loop;
   $PI_C$ is a controller performance index;
   N is a number of control loops; and
   a deviation is a difference between a setpoint value and an actual value.

11. A system having self evaluation comprising:
   a set of one or more field controllers;
   one or more devices connected to at least one of the one or more field controllers;
   a central station; and
   one or more building controllers connected to the central station; and
wherein:
   at least one of the one or more field controllers comprises at least one control loop connected to the at least one or more devices;
   each control loop has a performance index; and
   the performance index is determined from an actual value and a setpoint value of a parameter controlled by a control loop;
   the one or more field controllers are connected to one of the one or more building controllers;
   the central station determines and monitors the performance index of the one or more field controllers; and
   the central station provides suggestions as needed to a user of the system based on a performance index of a control loop.

12. The system of claim 11, wherein the central station further provides information of energy compliance and/or preventative maintenance service based on a performance index of a control loop.

13. The system of claim 11, wherein:
   the central station monitors the setpoint and actual values; and
   the central station and the one or more building controllers are connected by an interne or any networking medium.

14. The system of claim 12, wherein:
   the performance index of a control loop is indicated by a settling time and error value of the control loop;
   performance degradation due to aging increases settling time and in turn increases energy consumption for a given error value; and
   energy consumption is monitored via monitoring the settling time and error value by the central station.

15. A method for monitoring a condition of a building controller, comprising:
   monitoring a condition of one or more control loops of a building controller; and
   wherein monitoring a condition of a control loop comprises:
   identifying each control loop in the building controller;
   collecting samples of an actual value in each control loop at a per unit time rate;
   calculating a control loop performance index from the samples for each control loop at periodic intervals; and identifying each control loop having a decreased loop performance index.

16. The method of claim 15, wherein if a control loop has a decreased loop performance index, then one or more devices connected in the control loop are examined for degradation.

17. The method of claim 15 wherein:
a control loop performance index is determined by a settling time and an error value of a control loop; and
the error value is a difference between an actual value and a setpoint value.

18. The method of claim 15, wherein a performance index of the building controller is a standard deviation of loop performance indices of the entire one or more control loops of the building controller where the mean is 100.

19. An approach for controller evaluation comprising:
providing a controller having one or more controller loops;
operating the one or more controller loops;
measuring settling times of the one or more control loops;
monitoring error values of the one or more control loops;
determining control loop efficiencies of the one or more control loops from the settling times and error values, respectively;
wherein control loop efficiencies of the one or more control loops are determined from control loop performance indexing comprising:
identifying each control loop of the one or more control loops;
collecting samples of an actual value in each of the one or more control loops at one sample per unit time;
calculating a control loop performance index for each of the one or more control loops from the samples;
identifying one or more performance indices which have degraded; and
checking devices for performance degradation, of the one or more control loops having a performance index which has degraded is an indication of potential performance degradation for field devices connected to the respective one or more control loops.

* * * * *